United States Patent [19]
Ball

[11] 3,949,379
[45] Apr. 6, 1976

[54] PIPELINE DATA PROCESSING APPARATUS WITH HIGH SPEED SLAVE STORE

[75] Inventor: Roger James Ball, Cheadle Hulme, England

[73] Assignee: International Computers Limited, England

[22] Filed: July 12, 1974

[21] Appl. No.: 488,202

[30] Foreign Application Priority Data
July 19, 1973 United Kingdom............... 34427/73

[52] U.S. Cl. ............................................ 340/172.5
[51] Int. Cl.[2] ...................... G06F 9/06; G06F 9/20
[58] Field of Search .................................. 340/172.5

[56] References Cited
UNITED STATES PATENTS

| | | | |
|---|---|---|---|
| 3,394,353 | 7/1968 | Bloom et al. ................... | 340/172.5 |
| 3,629,853 | 12/1971 | Newton........................... | 340/172.5 |
| 3,717,850 | 2/1973 | Ghiron et al..................... | 340/172.5 |
| 3,736,566 | 5/1973 | Anderson et al. ............... | 340/172.5 |
| 3,840,861 | 10/1974 | Amdahl et al. .................. | 340/172.5 |

Primary Examiner—David H. Malzahn
Attorney, Agent, or Firm—George R. Douglas, Jr.; Anthony D. Cennamo

[57] ABSTRACT

A stage of a pipeline data processor has a store associated with it, and when that stage requires to write data into a specified address within that store, but the data to be written is not yet available, an indication of the address is stored in a special reserved register, so as to permit subsequent accesses to the store without waiting for that data to become available. When the data eventually becomes available, it is written into the store, using the contents of the register for addressing the store. This prevents hold-ups in the pipeline and hence increases the effective rate of instruction execution.

3 Claims, 2 Drawing Figures

PIPELINE DATA PROCESSING APPARATUS WITH HIGH SPEED SLAVE STORE

BACKGROUND OF THE INVENTION

This invention, relates to data processing apparatus and in particular to pileline data processors.

By a pipeline data processor is meant an apparatus which comprises a plurality of processing stages which are operative in turn to execute successive phases of an instruction and in which different phases of different instructions are executable concurrently by different stages of the apparatus. Such an apparatus can have a high operating speed, since the effective rate of processing is determined by the rate at which execution of instructions can be initiated, rather than the total time required to execute an instruction. The situation is analogous to an oil pipeline, in which the rate of transfer of oil depends on the rate of pumping oil into the pipeline rather than on the time required for it to flow from one end of the pipeline to the other.

Clearly, in a pipeline processor, it is important to minimise hold-ups at any of the processing stages which might block the operation of the whole apparatus. One such hold-up might occur in the situation where one of the stages is required to write information into a specified address of a store, but the actual information to be written is not yet available, because it depends on the result of execution of a later phase of the instruction. This could result in the execution of all subsequent instructions being held up until the required information becomes available.

SUMMARY OF THE INVENTION

According to the invention, there is provided a data processing apparatus comprising: a plurality of processing stages operative in turn to execute successive phases of an instruction, different phases of different instructions being executable concurrently by different stages of the apparatus; a store which is accessible by one of the stages during execution of a particular phase of an instruction; a register associated with the store, for holding an indication identifying a location within the store into which it is required to write information when it becomes available at a subsequent phase of execution of the instruction, thereby permitting subsequent accesses to be made to the store without waiting for that information to become available; and means operative when that information becomes available to apply the indication held in the register to the store so as to address the identified location and thus permit the information to be written therein.

In a preferred form of the invention, the store is a slave store which is arranged to contain information in current use by the associated stage of the processor, this information being fetched from a main store of the apparatus when required.

BRIEF DESCRIPTION OF THE DRAWING

One embodiment of the invention will now be described by way of example with reference to the accompanying drawings of which.

DESCRIPTION OF THE PREFERRED EMBODIMENT

Figure 1:
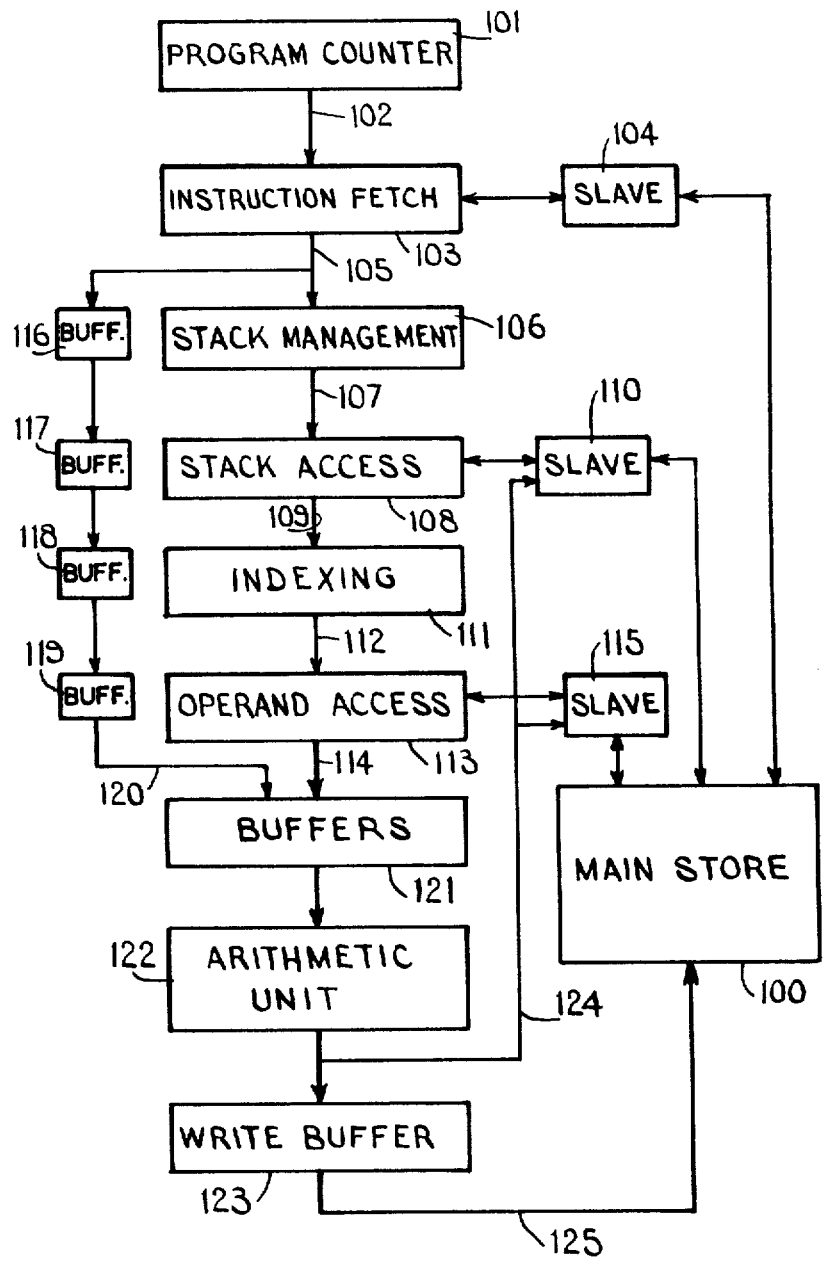
FIG. 1 is a schematic block diagram of a pipeline data processing apparatus.

Referring to FIG. 1, the apparatus includes a main store 100 which holds program instructions for the apparatus and also holds operands (data and variable) on which processing is to be performed. The store 100 may be organised on a hierarchical basis, with information divided into pages which are indirectly addressed by means of an address translation unit. However, these features are not essential to the present invention and will not be described further. One segment of the store, referred to as the stack, is arranged to operate as a push-down stack and serves a special purpose which will become apparent.

Each instruction contains a function code, specifying a particular arithmetic or other operation, the remainder of the instruction specifying the operand to which the function is to be applied. Operands may be specified in a number of different ways:

i. A literal operand is contained as a literal value within the instruction itself.

ii. A direct operand is accessed by a direct reference to the stack.

iii. An indirect operand is accessed indirectly by means of a descriptor contained in the stack which points to the operand location.

For convenience, the apparatus of FIG. 1 will initially be described only in relation to an indirect operand. The manner in which the processing of an instruction involving a literal or direct operand differs from this will then be described.

The first stage of the pipeline apparatus as shown in FIG. 1 is a program counter 101 arranged to produce a stream of instruction addresses on its output path 102. Normally these addresses are sequential, but jumps may be forced in the sequence as a result of branch or interrupt conditions in other parts of the apparatus.

The instruction address on path 102 is applied to an instruction fetch unit 103 which has associated with it a slave store 104 arranged to hold copies of a small number of instructions (32 say) from the main store and having a much faster access time than the main store 100. When it receives an instruction address, the unit 103 first interrogates an associative table to determine whether the required instruction is at present located in the slave store. If it is, the instruction can be read out very rapidly. Otherwise, an access must be made to the main store 100, which will involve a delay. However, the effect of such delays can be minimised by the provision of suitable buffers within the unit 103 and by fetching more than one instruction into the slave store 104 at each main store access.

The program counter 101, instruction fetch unit 103 and slave store 104 will not be described further since their detailed structure forms no part of the present invention and, in any case, such units are described in detail in co-pending U.S. Pat. application Ser. No. 488,200.

The instruction fetched by the unit 103 is applied over a path 105 to a stack management unit 106 which decodes the instruction so as to determine what steps must be taken to access the required operand. The decoding of the instruction will select one of a number of base registers (not shown) each of which contains a base address. The base address from the selected register is added to a displacement value contained within the instruction to produce a stack address for accessing the stack. Alternatively, the stack address may be obtained from a stack front register (not shown) which points to the top of the stack (i.e. the highest address within the stack which currently holds information) and which is continuously updated as information is added to or removed from the top of the stack.

The stack address on path 107 is applied to a stack access unit 108 which accesses the required information in the stack from a slave store 110, the information first being fetched, if necessary, from the main store 100. In the case of an indirect operand, the retrieved information represents a descriptor which points to the location of the operand.

The stack access unit 108 and its slave store 110 will be described in greater detail later with reference to FIG. 2.

The descriptor is applied over an output path 109 to an indexing unit 111 which modifies an address contained within the descriptor by adding to it the contents of a selected one of a number of index registers (not shown). The result is an operand address which is applied to an output path 112.

The operand address on path 112 is then applied to an operand access unit, which uses this address to access the required operand in a slave store 115, the operand first being fetched, if necessary, from the main store 100. The operand may then be read out on to an output path 114. Alternatively, or additionally, the operand may have to be updated, which involves writing an updated value of the operand into the accessed location of the slave store 115. Unfortunately, the updated value of the operand will not be available at this phase of execution of the instruction, since it is calculated at a later phase of execution (see below). In order to avoid any hold-up in the pipeline as a result of this, a special register, referred to as the write memory register, is provided in association with the slave store 115. This register, in effect, marks the location of the operand in the slave store. Operation can then proceed as if the write operation had, in fact, been completed.

The operand access unit 113, its slave store 115 and the write memory register will be described in detail later with reference to FIG. 2.

Simultaneously with the operations described above, the function code of the instruction is passed, in synchronism with the operation of the units 106, 108, 111 and 113 through a series of function buffers 116 - 119, so that when an operand appears on path 114, the associated function code appears simultaneously on the output path 120 from the last function buffer 119. Both function code and operand are then fed by way of a series of buffer registers 121, to an arithmetic unit 122 which performs the required function specified by the function code. The purpose of the buffer register 121 is to reduce hold-ups in the pipeline as a result of the arithmetic unit 122 having to execute a long instruction, such as multiply or divide. It also provides a supply of operands to the arithemetic unit so as to reduce hold-ups as a result of the operand access stage 113 having to fetch an operand from main store.

The result of the operation of the arithmetic unit 122 may be an updated value for an operand, which is applied over a path 124 into the previously marked location of the slave store 115. Whenever an operand in the slave store 115 is updated in this way, the corresponding operand in the main store 100 is also updated by way of a write buffer unit 123, over a path 125. A suitable form of write buffer unit is described in detail in copending U.S. Pat. application Ser. No. 488,201.

The above description of the operation of the apparatus assumed that the instruction was one involving an indirect operand. In the case of a direct operand, the operand location will be directly accessed in the stack by the stack access stage 108, and so the information which appears on path 109 will be the operand itself, rather than a descriptor. This operand will therefore be passed without modification, through the units 111, 113 and 121 to the arithmetic unit 122. If updating of the operand is required in this case, the operand location is marked by means of another write memory register associated with the slave store 110. As before, this prevents any hold-up in the pipeline due to the non-availability of the updated operand. When it becomes available from the arithmetic unit 122, the updated operand will be written into the previously marked location in the slave store 110 over path 124.

If the instruction involves a literal operand, no accessing operations are required, and the operand, obtained from the instruction on path 105, will, be passed without modification through the units 106, 108, 111, 113 and 121 to the arithmetic unit 122.

It should be appreciated that while the above description has only described the progress of a single instruction through the apparatus, in general, at any given instant, several instructions will be at different phases of execution in the apparatus, and execution of these different phases will be proceeding concurrently for different instructions. Thus, for example, while the arithmetic phase of one instruction is being executed by the arithmetic unit 122, the operand fetch phase of a subsequent instruction may be executed by the operand access unit, and so on.

An accessing unit (which may either be the stack access unit 108 or the operand access unit 113) and an associated slave store (either the slave store 110 or the slave store 115) will now be described in detail with reference to FIG. 2.

Figure 2:
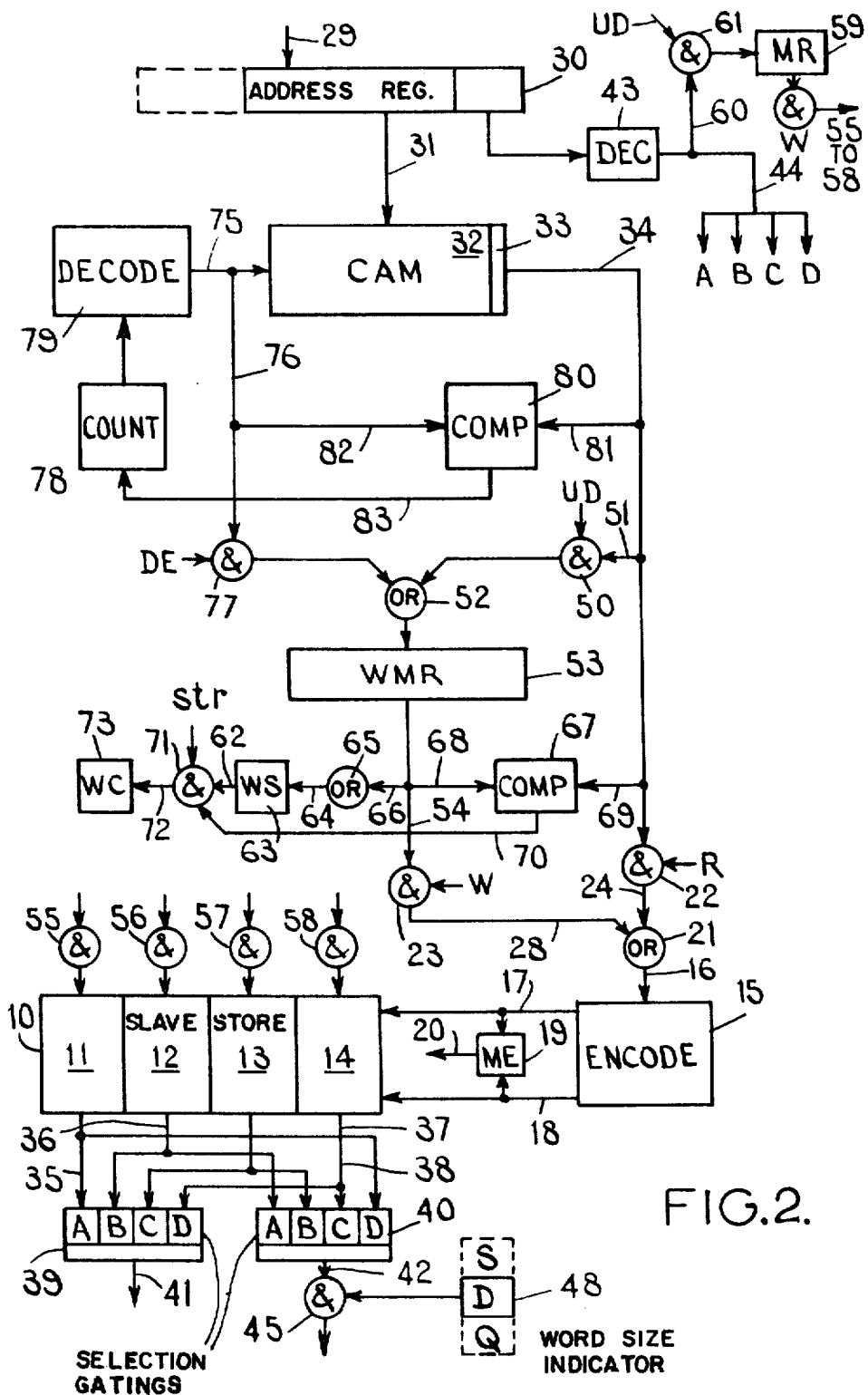
FIG. 2 is a more detailed schematic block diagram of a part of the apparatus of FIG. 1.

Referring to FIG. 2, a slave store 10 is shown partitioned into four parts 11, 12, 13 and 14 to indicate that each location thereof is arranged to store a four-word block of information. In practice, such a store will normally include a further section including parity bits for each word and, possibly, an address parity bit. This organisation of the store 10 is adopted because a four-word block is the smallest amount by which the main store (100, FIG. 1) is addressed.

The store 10 is a random access writable store. In the case of the stack slave store 110, FIG. 1, it has 16 locations each of four 32-bit words, whilst in the case of the operand slave store 115, FIG. 1, it has 32 such locations. Conveniently it is constructed from dual-in-line integrated circuits (dilics) and is addressed from an encoder 15 that has a multi-line input path 16 (one line for each block location in the store 10) and is operative in response to a signal on one of those lines to produce two address signals on groups 17 and 18 of output lines for coordinate type (X/Y) selection of the corresponding four-word block location. A multi equivalence circuit 19 is shown for checking that not more than one line of each of the X and Y groups 17 and 18 is selected at any one time and providing an output 20 for control purposes, e.g. initiating an access retry. The input path 16 is the output of OR-gating 21 fed from AND-gating 22 or 23 over 16-line paths 24 or 25 according to whether a read or a write operation if required at the selected store location.

Prior to any access of the slave store 10, the address of the information required is applied over multi-line path 29 to an address register 30. This address consists of a block address, identifying the four-word block within which the required information is held, and two further bits, identifying one of the words within that block. The block address is passed over path 31 to a content addressable memory 32 which contains a table of the block addresses of those four-word blocks which are currently present in the slave store 10. If the block address applied via 31 finds a match in 32, the corresponding one of a set of markers 33 will be set, thereby altering the state of one line in multi-line output 34. If the corresponding contents of the slave store 10 are to be read out, AND-gate 22 will be enabled and the slave store 10 will be read to supply outputs 35, 36, 37, 38 of the store parts 11, 12, 13, 14, respectively.

The slave store word output paths 35, 36, 37, 38 are shown connected to inputs A, B, C, D, and D, A, B, C, respectively, of coincidence gating 39 and 40 which supply single word multiline output paths 41 and 42, respectively. Each gating set 39, 40 can be considered as four sets of AND-gates feeding one OR-gate of word width. This output gating allows a single one of the four words of a block to be selected by enabling the appropriate section A, B, C or D of gating 39 or 40. The two further bits in the address register 30 are applied to a binary to one-out-of four decode 43 to produce appropriate energisation of one of its four output lines indicated together at 44. The output 44 is branched to enable correspondingly labelled sections of both of the gating sets 39 and 40, respectively, to give, on the outputs 41 and 42, two words appearing consecutively in the slave store 10 as most and least significant parts of a double word length output. Selection of a single or double word outputis shown according to whether AND gating 45 is enabled from a double word size indicator 48. The same effect could be accomplished if the word size indicator 48 controlled AND gating on the branches of output 44.

When a word resident in the slave store 10 needs to be altered, i.e. updated, its address will, in a pipelined machine, usually be available before the updated word itself and it is desired to avoid causing a holdup pending such availability so long as, in the interim, only other words in the slave store are concerned in slave store accesses. To deal with this, AND gating 50 is enabled when an update is known to be involved and this causes a branch 51 from path 34 to pass its state via OR-gating 52 to a write memory register 53 which has a bit capacity equal to the number of lines in path 34, (i.e. 16 in the case of the stack slave 110 and 32 in the case of the operand slave 115). The write memory register 53 thus stores an indication of which four-word location of the slave store includes a word to be updated, thus freeing the address register for further slave store reading cycles.

As soon as the data to be written is available, a write to the slave store can be made by enabling AND gate 23 in output path 54 of the write memory register 53, and also enabling the appropriate one of AND gates 55, 56, 57, 58 in inputs to the slave store word sections 11, 12, 13, 14. To ensure that the correct word of the slave store 10 is updated, a further memory register 59 is shown for storing the output of the word decoder 43 via branch path 60 and AND gate 61 enabled with the AND gate 50.

Only one bit of the write memory register 53 is allowed to be set at any one time. This is readily achieved using the output 62 of a bistable device 63 which is applied to the write memory register 53 to prevent any further writing to that register while the bistable device 63 is set. The device 63 is set by output 64 of OR gate 65 fed over branch 66 from the output 54 of the write memory register, and is reset after each write operation, when the write memory register 53 is also reset. In general, then, a further update to a different word block occurring before the previous one is completed will cause a processor hold-up. However, updates to other words of the same block need not cause such a hold-up. To cope with this, a comparator 67 receives both the state of the memory register 53 over branch 68 and the state of the path 34 over branch 69, and its output 70 supplies one input of AND gate 71 having another input enabled by the bistable 63. The AND gate 71 is strobed once per cycle and its output 72 represents whether a second update is required to the same four-word block. Pulses from this output 72 are used to increment a counter 73 that has a capacity of four and is decremented after every write operation. The output of this counter 73 is applied to the write memory register 53 so as to permit further writing to that register only if the contents of the counter are zero, indicating that all the required writes to the currently indicated block address have been completed. This is a particularly useful feature as updates to more than one word of a block are quite likely.

If no match is found when the block address is applied to the content addressable memory 32, this indicates that a copy of the required block is not present in the slave store 10, and must therefore be fetched from the main store 100 (FIG. 1) and written into the slave store. The write memory register 53 is also used in connection with such operations, as will now be described.

Referring still to FIG. 2, when a block is fetched from the main store and written into the slave store, it must overwrite one of the blocks already in the slave store. The block to be overwritten is selected on the basis of least use, by a replacement pointer mechanism as follows. A multi-line input path 75 to the content addressable memory 32 always has one line set and that line points at the next location to be used for writing a newly-fetched block to the slave store 10. The path 75 is branched at 76 to AND gate 77 which supplies another input to OR gate 52 via which input is gained to the write memory register 53. This AND gate 77 is enabled when an address is available for a word that is to be written to the slave store 10. In the same way as for an update, this frees the address register 30 for use in subsequent read accesses of the slave store. Data entry to the slave store is always in four word blocks so that gates, 55 to 58 will all be enabled when data to be entered is available, i.e. when gate 23 is enabled for a write on data entry.

The input path 75 is controlled by the state of a counter 78 via a binary decoder 79 which, in effect, operates as a shift register that is clocked once for every data entry. In order to try to minimise the amount of rewriting to the slave store 10, the simple sequential nature of the pointer mechanism is enhanced by ensuring that a block that included the last used word will go to the end of the priority list for replacement. This is done using a comparator 80 which receives an indication over branch 81 of the currently associated block location and an indication over branch 82 of the block location at for replacement. Whenever these coincide an output 83 of the comparator 80 causes the counter 28 to be incremented.

During each processor cycle, the first part thereof is occupied by operation of the associative store 32 and the second part is sufficient to allow a read operation on the slave store 10 at an address for which a match was indicated in the first part of the same cycle. A write operation to the slave store can therefore take place in the first part of the next processor cycle after it becomes available without interfering with an associate followed by a read in the same cycle.

The use of relatively small slave stores, e.g. 64 words at the instruction and stack slaves and 128 words at the operand slave in four word blocks in each case, allows a processor cycle time that, with present semiconductor technology for logic and store integrated circuits, closely matches the time required for a typical operation, e.g. the address asssociates and slave store read mentioned above, an instruction or descriptor decode and completion of the specified addition, and generation of conditions requiring alteration of actions in the next cycle. In one practical embodiment, a cycle time of 80 nanoseconds has been found suitable.

I claim:

1. Data processing apparatus comprising:
   instruction sequencing means for providing a sequence of instructions for execution;
   slave store means having a plurality of locations for holding operands in current use by the apparatus;
   means responsive to an instruction in said sequence to produce an address signal specifying one of the locations in the slave store means;
   a register;
   means for gating said address signal into the register;
   means for selecting either said address signal or the contents of said register for application to the slave store means to access a location therein;
   arithmetic means responsive to an instruction in said sequence to perform arithmetic operations on an operand to produce a result signal;
   means for gating an operand from the accessed location of the slave store means to the arithmetic means; and
   means for gating said result signal from the arithmetic means into the accessed location of the slave store means.

2. Data processing apparatus comprising:
   instruction sequencing means for producing a sequence of instructions for execution;
   slave store means having a plurality of locations for holding operands in current use by the apparatus;
   means responsive to an instruction in said sequence to produce an address signal specifying one of the locations in the slave store means;
   a register;
   means for gating said address signal into the register;
   arithmetic means responsive to an instruction in said sequence to perform arithmetic operations on an operand to produce a result signal;
   means for applying said address signal to the slave store means to access a location therein and to gate out an operand from the accessed location to the arithmetic means; and means for applying the contents of the register to the slave store means to access a location therein and to gate said result signal into the accessed location.

3. Data processing apparatus comprising:
   instruction sequencing means for providing a sequence of instructions for execution;
   slave store means having a plurality of locations for holding operands in current use by the apparatus;
   first execution means for executing a first phase of an instruction to produce an address signal specifying one of the locations in the slave store means;
   a register;
   means for gating said address signal into the register;
   second execution means operative at the completion of the first phase of a first instruction and concurrently with the execution of the first phase of a subsequent instruction in the sequence, for executing a second phase of the first instruction to produce a result signal;
   means operative at the completion of the first phase of an instruction to apply said address signal to the slave store means to access a location therein and to gate out an operand from the accessed location to the second execution means; and
   means operative at the completion of the second phase of an instruction to apply the contents of said register to the slave store means to access a location therein and to gate said result signal into the accessed location.

* * * * *